(12) United States Patent
Kummer et al.

(10) Patent No.: US 6,698,564 B2
(45) Date of Patent: Mar. 2, 2004

(54) RAMP SEGMENTS FOR CENTRIFUGAL RAMP REACTION PLATE

(75) Inventors: Martin E. Kummer, Auburn, IN (US); James R. Hockemeyer, Hoagland, IN (US); Troy S. Reinoehl, Ashley, IN (US); Gregory Papp, Brownstown, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/943,486

(22) Filed: Aug. 30, 2001

(65) Prior Publication Data

US 2003/0042105 A1 Mar. 6, 2003

(51) Int. Cl.$^7$ ........................... F16D 19/00; F16D 43/10
(52) U.S. Cl. .................................. 192/93 R; 192/105 C
(58) Field of Search ........................ 192/93 R, 93 A, 192/70.23, 105 CP, 105 C, 107 M, 107 R, 109 R

(56) References Cited

U.S. PATENT DOCUMENTS

| | | | | |
|---|---|---|---|---|
| 2,230,520 A | * | 2/1941 | Wemp | 188/135 |
| 2,263,702 A | * | 11/1941 | Kreis | 192/105 CP |
| 2,275,068 A | * | 3/1942 | Ruesenberg et al. | 192/105 C |
| 2,591,873 A | * | 4/1952 | Risk et al. | 192/70.22 |
| 2,987,155 A | * | 6/1961 | Maurice et al. | 192/105 C |
| 4,552,259 A | * | 11/1985 | Albertson | 188/251 A |
| 5,441,137 A | * | 8/1995 | Organek et al. | 192/35 |
| 5,860,890 A | * | 1/1999 | Antonov | 192/107 M |
| 6,502,476 B2 | * | 1/2003 | Genise | 74/336 R |
| 2002/0072447 A1 | * | 6/2002 | Genise | 477/77 |

* cited by examiner

Primary Examiner—Rodney H. Bonck
Assistant Examiner—David D. Le
(74) Attorney, Agent, or Firm—Rader, Fishman & Grauer PLLC

(57) ABSTRACT

A clutch ramp reaction plate is adapted to be positioned adjacent a centrifugal actuation module of a centrifugally actuated vehicular clutch. The ramp reaction plate includes attached individually machined ramp segments manufactured separately from the ramp reaction plate. In one embodiment, the ramp segments are made from a powdered metal process to assure uniform tolerances. In an alternate embodiment, the ramp segments are formed of hardened stamped steel material. The ramp reaction plate is machined to accept the segments, which includes a surface hardness higher than that of the ramp reaction plate to accommodate wear resistance. The ramp segments can be impregnated with lubricants or polytetrafluoroethylene materials to reduce rolling friction and wear between the ramp surfaces and mass weight rollers of the centrifugal actuation module that interacts with the ramp surfaces. The segments are attached to the ramp reaction plate by means of fasteners including bolts, rivets, or adhesives.

18 Claims, 5 Drawing Sheets

RAMP SEGMENTS FOR CENTRIFUGAL RAMP REACTION PLATE

BACKGROUND OF THE INVENTION

1. Field of Invention

This invention relates generally to improvements in the manufacture of ramp modules for ramp reaction plates adapted to interface with weight and roller centrifugal modules of automatic centrifugal clutches. More particularly, the invention relates to improvements in ramp modules affixed to ramp reaction plates, and commensurately to improved operation of vehicular clutches.

2. Description of the Prior Art

Automatically actuated centrifugal clutches include actuation modules of the type including centrifugal weights affixed to vehicular clutch covers. The weights are radially movable against spring loads as a function of engine speed. Several issues work against ideal operation of the modules over the useful lives of the clutches. For example, individually machined ramp units normally formed on and integral to the ramp reaction plates require very close manufacturing tolerances for each individual ramp profile. The process is expensive, slow, and works against achievement of manufacturing efficiencies.

In addition, the existence of tolerance variations in profile ramp angles creates nonuniform movements of the centrifugal mass weight rollers, giving rise to uneven performance of the centrifugal module during clutch actuation. As a result, the centrifugal module is vibration prone in one aspect of its less than satisfactory operation. In addition, to the extent that the tolerance variations limit proper interaction of the mass weight rollers and ramp reaction plate reaction modules during actuation, the overall efficiency and performance of the clutch actuation module suffers.

SUMMARY OF THE INVENTION

The present invention facilitates improved operation of a centrifugal actuation module in a centrifugally actuated vehicular clutch. In the described embodiment, a clutch ramp reaction plate is positioned adjacent the centrifugal actuation module. The ramp reaction plate is manufactured apart from individually machined ramp segments that are separately attached to the ramp reaction plate. In one embodiment, the ramp segments are made from a powdered metal process to assure that the tolerances are uniform from one ramp segment to the next. In an alternate embodiment, the ramp segments are formed of a hardened stamped steel material. The ramp reaction plate is machined to accept the segments. The segments include surface hardnesses that are higher than that of the ramp reaction plate to accommodate wear resistance.

The use of separate manufacturing processes for the ramp segments assures that they can be hardened in bulk from a harder material than that of the ramp reaction plate. In addition, the powdered metal ramp segments can be impregnated with lubricants or polytetrafluoroethylene materials to reduce rolling friction and wear between the ramp surfaces and the mass weight actuated rollers interacting with the surfaces.

The segments are attached to the ramp reaction plate by means of various fasteners including bolts, rivets, or adhesives. In one described embodiment, a special lip permits the strength requirement of the fastener to be reduced to the extent that the lip is adapted to resist centrifugal forces acting on the segment. Use of separately manufactured segments substantially reduces manufacturing costs, and assures higher product quality with lower tolerance variations.

DETAILED DESCRIPTION OF THE EMBODIMENTS

Figure 1:
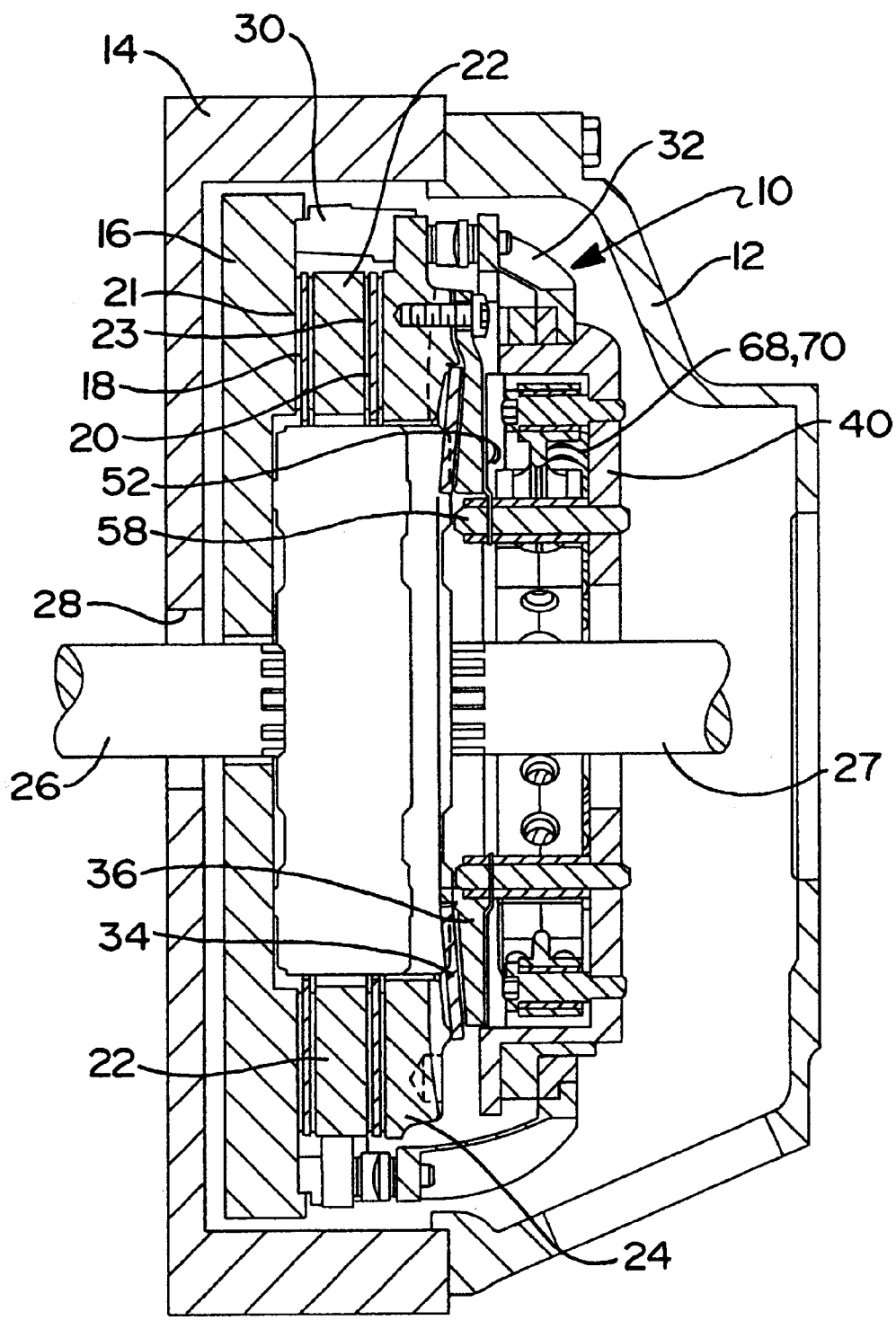
FIG. 1 is a cross-sectional view of a normally open centrifugal clutch that incorporates the improved clutch drive ramp reaction plate of the present invention.

Referring initially to FIG. 1, an automatically actuated centrifugal clutch 10 is designed for use in a motor vehicle, not shown. The clutch 10 is enshrouded between a bell housing 12 of a transmission (also not shown) and a flywheel shroud or housing 14 coupled externally to the bell housing 12. The centrifugal clutch 10 is of the normally unengaged type that relies upon engine speed to initiate actuation, and hence engagement. The clutch is normally used with an electromechanical style automatic transmission, and is employed in vehicles that are normally without a clutch pedal.

The flywheel housing 14 envelops an engine flywheel 16 that is bolted to an engine crankshaft 26 for direct rotation therewith. In the embodiment described, a pair of friction plates 18, 20 includes friction linings 21, 23, which are bonded, riveted, or welded to the plates 18, 20. The friction plates are adapted to be releasably clasped between the flywheel 16, an intermediate plate 22, and a pressure plate 24. The friction plates 18, 20 are directly attached to, and rotate with, a transmission input shaft 27. Those skilled in the art will appreciate that the transmission input shaft 27 is positioned coaxially with respect to the engine crankshaft 26, but is axially spaced therefrom as depicted.

The engine crankshaft 26 is affixed to the engine flywheel 16. For this purpose, the shaft 26 extends through an aperture 28 of the flywheel housing 14 as shown. A circumferentially extending flywheel ring 30 is rigidly affixed to the flywheel 16, and an external clutch cover 32 is secured to the flywheel ring. The clutch cover, the pressure plate 24, and the intermediate plate 22 are all affixed to the flywheel ring 30. (In some embodiments, the ring 30 is equivalent to the cover 32.) All of the respectively described members are permitted to move axially, though non-rotatably, in reference to the flywheel ring. Thus, as the flywheel ring 30 rotates during operation of the vehicle engine, the described coupled members all rotate together at the same speed as the ring 30.

All members described herein rotate with the flywheel ring 30 with the exception of the pair of friction plates 18, 20 that are clasped, i.e. "clutched", between the axially movable flywheel 16, the intermediate plate 22, and the pressure plate 24 as described above. Any leftward movement of the pressure plate 24 actuates the clutching of the friction plates 18, 20. In addition, it will be appreciated that all of the plates, apart from the plates 18, 20 are annular in shape, as required to permit the transmission input shaft 27 to pass through the centers of each of the plates that rotate with the flywheel ring 30.

Figure 2:
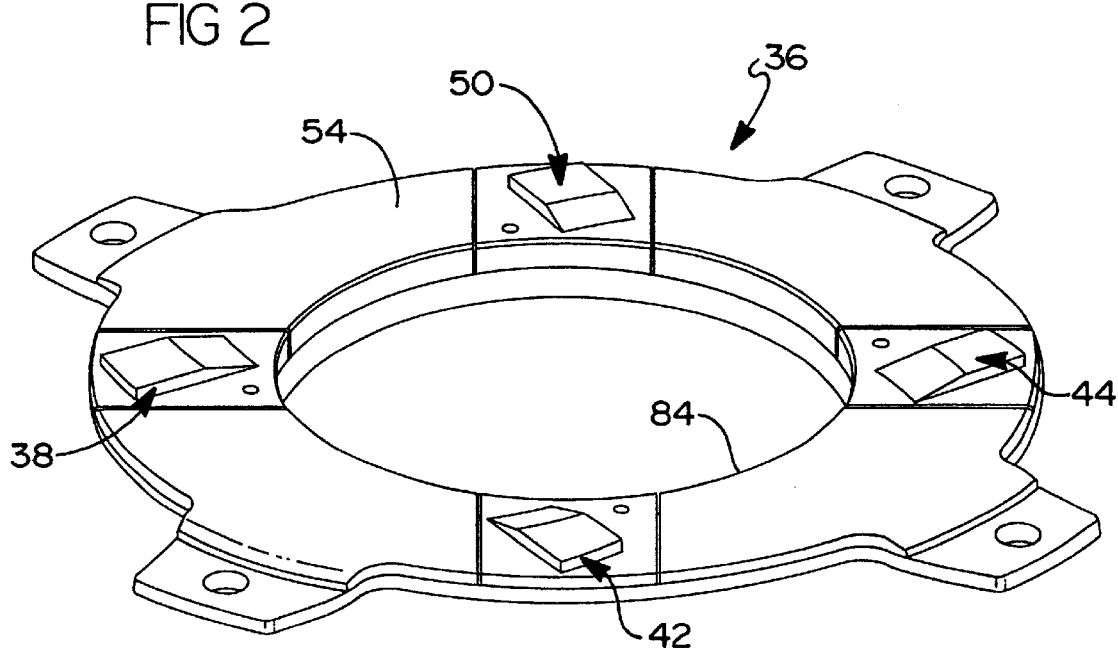
FIG. 2 is a view of one embodiment of a clutch actuation ramp reaction plate of the centrifugal clutch of FIG. 1, including a plurality of ramp segments affixed to the plate for interaction with a weight roller system of a centrifugal weight-spring clutch actuation module of the clutch of FIG. 1.
Figure 3:
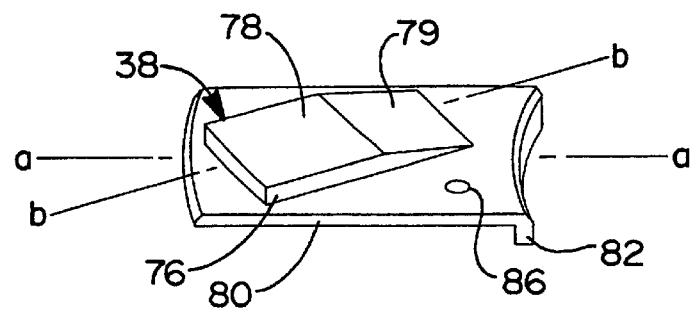
FIG. 3 is an enlarged perspective view of one of the ramp segments.
Figure 4:
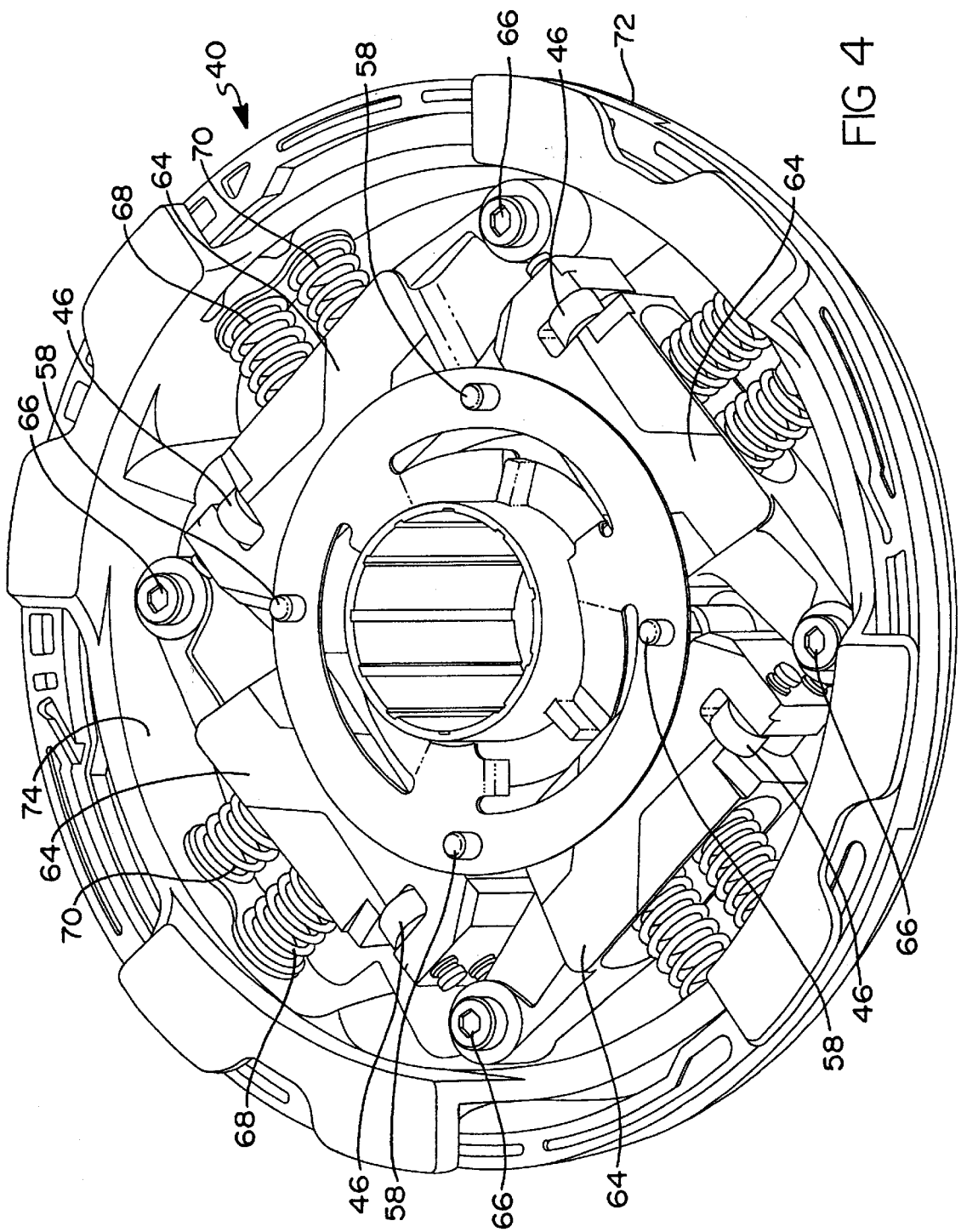
FIG. 4 is a perspective end view of a centrifugal weight spring clutch actuation module included in the centrifugal clutch of FIG. 1.

Referring now also to FIGS. 2–4, in order to initiate such clutching, a centrifugal module 40 is provided, the module having a circumferentially arranged plurality of weights 64 pivotally disposed within a housing 72 of the module 40. The weights are attached to pivot links 66 fixed to the housing 72, and are adapted to swing radially outwardly against centrifugal force induced upon them by engine speed. The amount of angular pivotal movement of the weights 64 is controlled by compression springs 68, 70 that are secured between the weights 64 and the internal diameter 74 of the module housing 72.

A ramp reaction plate 36 (FIGS. 1 and 2) directly engages a resilient diaphragm 34 (FIG. 1). It will be appreciated that rollers 46, 48 (FIG. 4) move radially outwardly under centrifugal forces induce upon the rollers by the weights 64. The axially fixed but radially movable rollers, however, directly engage the ramp segments 44 (FIG. 2), fixed to the axially movable ramp reaction plate 36 to cause the ramp reaction plate 36 to move leftwardly (FIG. 1) against the force of the diaphragm 34. This action produces the earlier described "clutching", wherein the friction plates 18, 20 become coupled, i.e. rotationally locked, to the flywheel 16, as will be appreciated by those skilled in the art.

In accordance with this invention, and referring now particularly to FIGS. 2 and 4, the annular ramp reaction plate 36 is interposed against the centrifugal clutch actuation module 40. Individually manufactured ramp segments 38, 42, 44, 50 are circumferentially spaced about the planar face 54 of the ramp reaction plate 36, each segment being rigidly secured to the ramp reaction plate 36 by rivets, bolts, or via an adhesive. As alluded to earlier, corresponding sets of circumferentially spaced spring-loaded rollers 46 are designed to directly engage corresponding ramp segments 38, 42, 44, 50.

As the speed of the engine increases, e.g. measured in revolutions per minute of the crankshaft 26, the weights 64 will be urged radially outwardly against the compressive forces of springs 68, 70. Centrifugal forces on the weights will cause the weights to pivot radially outwardly a distance proportional to the engine speed. In the described embodiment, the clutch 10 will remain disengaged at idle speeds in the range of 650 to 850 rpm, as the forces of the springs 68, 70 will be sufficient to counter the centrifugal forces on the weights 64 at that engine speed. Upon additional engine fueling rates, the engine speed will progress to higher values resulting in clutch actuation movement initiated by the rollers 46, 48 against the ramps 38, 42, 44, and 50. By the time the clutch assembly 10 is rotating at speeds in the range of 1200 to 1500 rpm, the clutch 10 will be fully engaged, and the friction disks 18, 20 fully clutched.

Against this background, and referring now particularly to FIG. 3, the ramp segment 38 is representatively shown in greater detail. All of the ramps segments 38, 42, 44, 50 are identical in their features; only their relative positions about the annular ramp reaction plate 36 vary. Ideally, the segments and their corresponding interactive rollers 46 are circumferentially spaced apart in regular angular intervals for achievement of an optimal centripetal force balance, to the extent that the masses of the weights, rollers, and ramp segments all rotate with the engine flywheel.

Each ramp segment 38 is comprised of an integral, one-piece metallic member including a boss defined by a raised portion 76 integral to but situated atop a base plate 80. Ideally, the ramp segments are formed in a batch process to assure consistent uniformity of hardnesses and dimensions of said segments. The raised portion 76 is angled to the base plate 80 in the described embodiment. The portion 76 incorporates a dwell portion 78 contiguously abutted by an angled cam portion 79. The rollers 46 engage the angled cam portion 79 during the clutch actuation phase described above. At and above clutch engagement speeds, however, the rollers engage and remain contact with the dwell portion 78.

For accommodating the rollers 46, the raised portion 76, which is generally rectangular in shape, is disposed along a longitudinal axis b—b, which does not dictate orientation of the separate axis a—a of the base plate 80. As apparent in FIG. 3, the two axes do not coincide or run together. Moreover in the embodiment of FIG. 3, the base 80 of the ramp segment 38 incorporates a lip 82 disposed orthogonally to the base 80. The lip has a corresponding arcuate shape of, and is sized to capture, the interior diameter 84 of the annular ramp reaction plate 36.

Those skilled in the art will appreciate that the lip produces the structural strength requirement of the segment 38. This is because, especially at high revolutions per minute, centrifugal forces imposed on ramp segments 38 will be effectively transferred to the lips 82 and, in turn, to the internal diameter 84 of the plate 36. As such, a single rivet (not shown) may be installed into an aperture 86 to securely attach the segment 38 to the face 54 of the plate 36.

Figure 5:
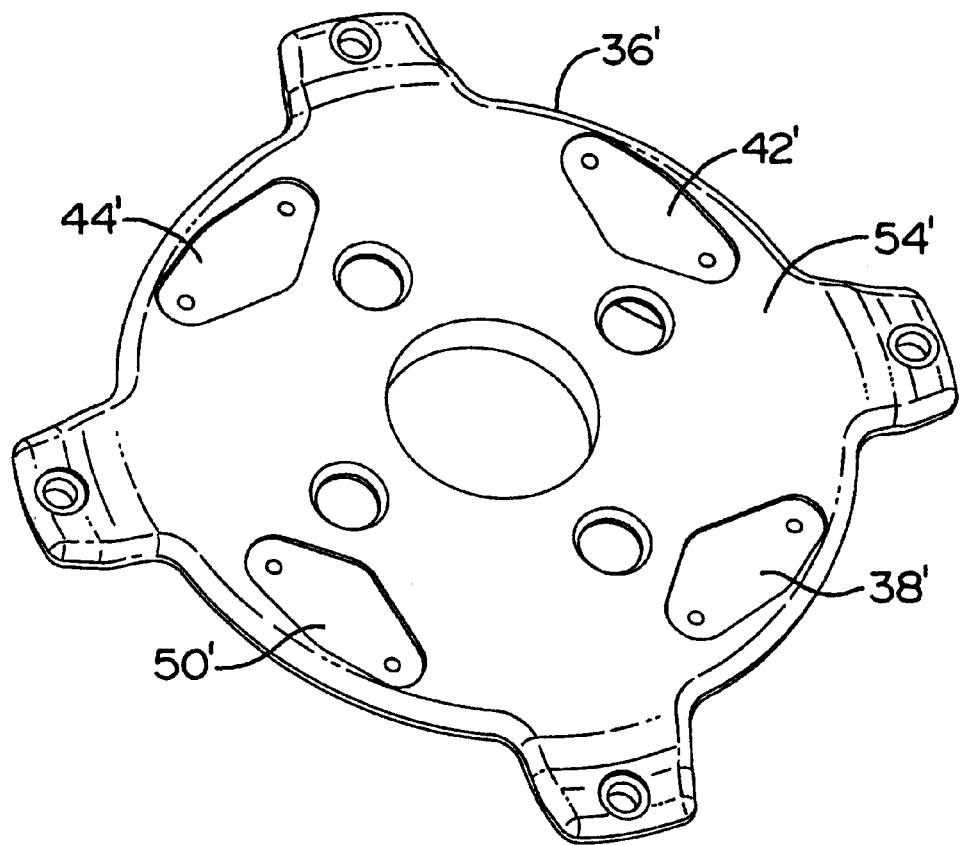
FIG. 5 is a perspective face view of a second embodiment of the clutch drive ramp reaction plate of the present invention.
Figure 7:
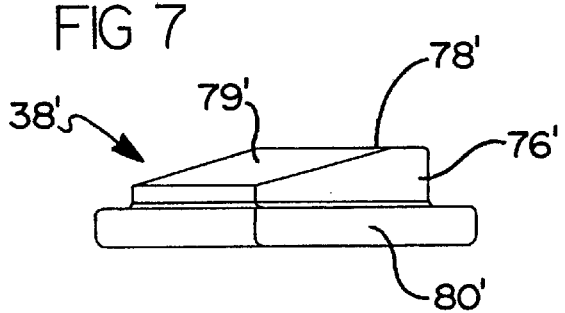
FIG. 7 is an elevation view along lines 7—7 of the ramp reaction plate segment of FIG. 6.
Figure 6:
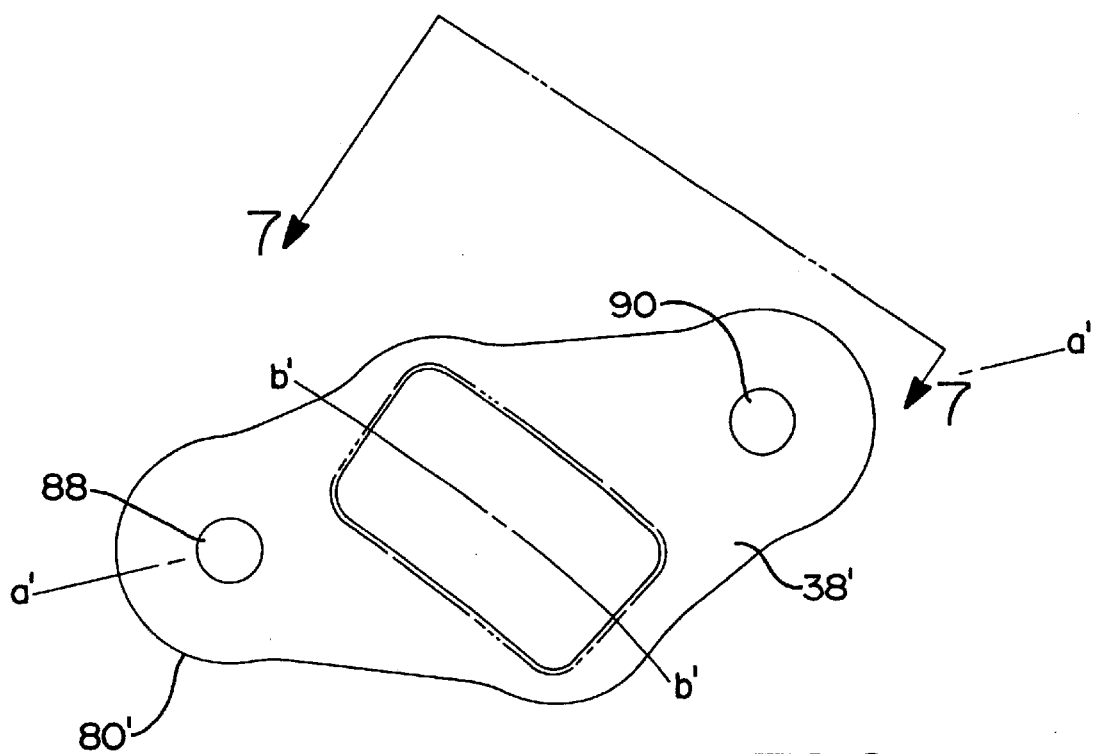
FIG. 6 is an alternate embodiment of the drive ramp reaction plate segment employed in the ramp reaction plate of FIG. 5.

FIG. 5 represents another embodiment of the ramp reaction plate 36' which incorporates attached ramp segments 38', 42', 44', and 50'. Referring now also to FIG. 6 and FIG. 7, the ramp segment 38' is shown in greater detail. The segment 38' includes a raised portion 76' as well as an oval base plate 80', having a major axis a'–a'. The segment 38', however, is without the lip 82. Thus two rivets or connectors (not shown) are inserted through apertures 88 and 90 to secure the segment 38' to the ramp reaction plate 36'. The segments 36' are substantially similar to segments 36 and all other respects, and cooperate with the rollers 46 in the same manner.

In each of the noted embodiments, the segments 38, 38' may be formed of a powdered metal composition to insure consistent uniformity of size and shape. Alternatively, the segments 38, 38' may be formed as a hardened stamped metal part, i.e. steel in the disclosed embodiment. Maintaining such uniformity is difficult when the manufactured plates already include the segments; in such cases the segments must be separately finished while comprising an integral part of the plate. Processes for achieving uniformity under such circumstances have not been satisfactory. For example, in some cases it has been virtually impossible to achieve uniform hardnesses among segments integrally affixed to the plate.

Finally, in accordance with the disclosed invention, shape of the segments 38, 38' can be readily varied to achieve various performance characteristics, strictly as a function of clutch actuation dynamics. The invention thus adds a dimension of significant versatility, in addition to reducing manufacturing costs, assuring higher product quality, and achieving smaller tolerance variation from part to part.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A clutch ramp reaction plate adapted for use in a centrifugally actuated vehicular clutch, said ramp reaction plate comprising at least one face, and including a plurality of preformed ramp segments fixedly secured to said face, said segments including faces that are angled with respect to said face of said plate, said faces of said segments including a first surface having a first angle and a second surface having a second angle different from said first angle, said first and second surfaces positioned to be engaged by rollers attached to actuating weights of a centrifugal clutch actuation module and to axially displace said ramp reaction plate with respect to the module, wherein each ramp segment comprises a material composition that is harder than said composition of said plate.

2. The clutch ramp reaction plate of claim 1 wherein said ramp segments are fixedly secured to said face of said plate.

3. The clutch ramp reaction plate of claim 1 wherein said ramp reaction plate comprises an annular body, and wherein said ramp reaction plate is adapted to rotate with the centrifugal module.

4. The clutch ramp reaction plate of claim 3 wherein said surfaces of said ramp segment comprise an angled profile surface and a generally flat dwell surface, said surfaces contiguously joined together.

5. The clutch ramp reaction plate of claim 4 wherein said ramp segment is formed of a powdered metal.

6. The clutch ramp reaction plate of claim 4 wherein said ramp segment is formed of a hardened stamped steel.

7. The clutch ramp reaction plate of claim 4 wherein said ramp segment comprises a raised portion and a base plate integral to said raised portion.

8. The clutch ramp reaction plate of claim 7 wherein said ramp segments are circumferentially spaced apart by regular intervals about said annular body of said ramp reaction plate.

9. The clutch ramp reaction plate of claim 8 wherein said ramp segments are formed in a batch process to assure consistent uniformity of hardnesses and dimensions of said segments.

10. The clutch ramp reaction plate of claim 9 wherein said ramp segments are impregnated with a lubricant material to enhance performance between said ramp segment and said rollers of the centrifugal module.

11. The clutch ramp reaction plate of claim 10 wherein said base plate is generally oval, and is oriented about a major axis, and wherein said raised portion is generally rectangular, and is oriented about a separate longitudinal axis.

12. The clutch ramp reaction plate of claim 11 wherein said longitudinal axis of said raised portion is non-coincident with respect to said major axis of said base plate.

13. A clutch ramp reaction plate adapted for use in a centrifugally actuated vehicular clutch, said ramp reaction plate comprising at least one face, and including a plurality of preformed ramp segments fixedly secured to said face, said segments including faces that are angled with respect to said face of said plate, said faces of said segments including a first surface having a first angle and a second surface having a second angle different from said first angle, said first and second surfaces positioned to be engaged by rollers attached to actuating weights of a centrifugal clutch actuation module and to axially displace said ramp reaction plate with respect to the module, the rollers moveable between a clutch actuation position in which said first surfaces of said segments are engaged and a dwell position wherein said first surfaces of said segments are not engaged, wherein each ramp segment comprises a material composition that is harder than said composition of said plate, and wherein said ramp reaction plate is adapted to rotate with the centrifugal module.

14. The clutch ramp reaction plate of claim 13 wherein said surfaces of said ramp segment comprise an angled profile surface and a generally flat dwell surface, said surfaces contiguously joined together.

15. The clutch ramp reaction plate of claim 14 wherein said ramp segment comprises a raised portion and a base plate integral to said raised portion.

16. The clutch ramp reaction plate of claim 15 wherein said ramp segment is formed of a powdered metal.

17. A clutch ramp reaction plate adapted for use in a centrifugally actuated vehicular clutch, said ramp reaction plate comprising at least one face, and including a plurality of preformed ramp segments fixedly secured to said face, said segments including faces that are angled with respect to said face of said plate, said faces of said segments including a first surface having a first angle and a second surface having a second angle different from said first angle, said first and second surfaces positioned to be engaged by rollers attached to actuating weights of a centrifugal clutch actuation module and to axially displace said ramp reaction plate with respect to the module, wherein each ramp segment comprises a material composition that is harder than said composition of said plate, and said surfaces of said ramp segments comprise an angled profile surface and a flat dwell surface, said surfaces contiguously joined together, and wherein said ramp segments further include a raised portion and a base plate integral to said raised portion, are formed of a powdered metal, and are impregnated with a lubricant material to enhance performance between said ramp segments and the rollers of the centrifugal module via reduction of rolling friction and wear between the ramp segments and the rollers.

18. The clutch ramp reaction plate of claim 17 wherein the rollers are moveable between a clutch actuation position in which said angled profile surfaces are engaged and a dwell position wherein said flat dwell surfaces are engaged.

* * * * *